United States Patent
Koo (10) Patent No.: US 12,195,108 B2
(45) Date of Patent: Jan. 14, 2025

(54) STEERING CONTROL METHOD AND STEERING CONTROL DEVICE

(71) Applicant: HL MANDO CORPORATION, Gyeonggi-do (KR)

(72) Inventor: Jung Mo Koo, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 187 days.

(21) Appl. No.: 18/116,841

(22) Filed: Mar. 3, 2023

(65) Prior Publication Data

US 2023/0303158 A1 Sep. 28, 2023

(30) Foreign Application Priority Data

Mar. 22, 2022 (KR) .................. 10-2022-0035369

(51) Int. Cl.
*B62D 7/22* (2006.01)
*B62D 5/00* (2006.01)
*B62D 5/04* (2006.01)
*B62D 6/00* (2006.01)

(52) U.S. Cl.
CPC ........... *B62D 5/0472* (2013.01); *B62D 5/006* (2013.01); *B62D 6/001* (2013.01); *B62D 6/008* (2013.01); *B62D 5/0409* (2013.01); *B62D 5/0448* (2013.01)

(58) Field of Classification Search
CPC ......... B62D 5/006; B62D 5/072; B62D 7/222
See application file for complete search history.

(56) References Cited

U.S. PATENT DOCUMENTS

| 9,701,338 B2* | 7/2017 | Tsubaki | B62D 5/0463 |
| 2007/0107979 A1* | 5/2007 | Limpibunterng | B62D 5/008 |
| | | | 180/446 |
| 2015/0088381 A1* | 3/2015 | Imamura | B62D 6/008 |
| | | | 701/41 |
| 2015/0151783 A1* | 6/2015 | Kitazume | B62D 5/0481 |
| | | | 701/42 |
| 2016/0318548 A1* | 11/2016 | Tsubaki | B62K 21/08 |
| 2020/0010111 A1* | 1/2020 | Tsubaki | B62D 5/0463 |
| 2020/0156698 A1* | 5/2020 | Tsubaki | B62D 5/0463 |
| 2022/0289205 A1* | 9/2022 | Kodera | B60W 40/105 |
| 2022/0315097 A1* | 10/2022 | Yoshida | B62D 6/008 |
| 2022/0315103 A1* | 10/2022 | Mori | B62D 5/0463 |

* cited by examiner

*Primary Examiner* — Long T Tran
(74) *Attorney, Agent, or Firm* — WOMBLE BOND DICKINSON (US) LLP

(57) ABSTRACT

The present embodiments may provide a steering control method and a steering control device capable of compensating for shimmy even when the torque sensor fails and removing only shimmy components without affecting the steering feel by compensating for shimmy using the road wheel actuator-side rack force signal, rather than the steering feedback actuator-side torque signal.

20 Claims, 10 Drawing Sheets

STEERING CONTROL METHOD AND STEERING CONTROL DEVICE

CROSS-REFERENCE TO RELATED APPLICATION

This application claims priority from Korean Patent Application No. 10-2022-0035369, filed on Mar. 22, 2022, which is hereby incorporated by reference for all purposes as if fully set forth herein.

BACKGROUND

Field

The present embodiments relate to a steering control method and a steering control device.

Description of Related Art

In general, power steering has been developed and applied to vehicle steering control devices that assist the driver in manipulating the steering wheel to provide steering convenience. Power steering may include a hydraulic type using hydraulic pressure, an electro-hydraulic type using both hydraulic pressure and electric power of a motor, and an electric type using only the electric power of a motor.

Recent steer-by-wire (SBW) steering control devices do away with mechanical/physical linkages, such as universal joint or pinion shaft, between the steering wheel and the front wheels, using a motor instead to steer the vehicle.

The steer-by-wire steering control device includes a steering feedback actuator (SFA) as an upper stage device and a road wheel actuator (RWA) as a lower stage device.

The road wheel actuator includes an auxiliary power motor for providing auxiliary power to move the rack bar connected to the tie rods of the wheels to the left and right, and the steering feedback actuator includes a reaction force motor device to provide reaction force torque to the steering wheel according to steering through the rack bar.

Meanwhile, vibration may occur in the vehicle due to, e.g., wheel imbalance or poor uniformity, which is called shimmy or shimmy vibration.

When the steer-by-wire steering control device provides reaction force to the steering wheel using the reaction force motor provided in the steering feedback actuator, it is preferable to provide proper reaction force torque to the steering wheel according to variations in rack force depending on an external input, such as from the road surface, but applying even variations in rack force due to shimmy vibration to the reaction force torque may negatively affect the steering feel. This leads to the need for compensating for the shimmy vibration and applying it to the reaction force torque.

Conventionally, the shimmy frequency is found using the torque signal by the torque sensor provided on the steering shaft, and the shimmy vibration is compensated for by signal-processing the shimmy frequency. However, if shimmy compensation is performed on the steer-by-wire steering control device including the steering feedback actuator based on the torque signal as conventional, an unintended negative influence may be had on the vehicle steering feel due to, e.g., phase delay. Further, if the torque sensor fails, it may be impossible to perform shimmy compensation based on the torque signal.

BRIEF SUMMARY

The present embodiments may provide a steering control method and a steering control device capable of compensating for shimmy even when the torque sensor fails and removing only shimmy components without affecting the steering feel by compensating for shimmy using the road wheel actuator-side rack force signal, rather than the steering feedback actuator-side torque signal.

In an aspect, the present embodiments may provide a steering control method comprising a shimmy compensation logic operation step determining whether a shimmy compensation logic operates based on a signal received from a sensor provided in a vehicle and operating the shimmy compensation logic, a shimmy compensation rack force generation step generating a shimmy compensation rack force based on a velocity of a wheel and a rack force signal of the vehicle if the shimmy compensation logic operates, and a reaction force torque signal output step generating a reaction force torque signal based on the shimmy compensation rack force and outputting the reaction force torque signal to a reaction force motor.

In another aspect, the present embodiments may provide a steering control device comprising a shimmy compensation logic operation unit determining whether a shimmy compensation logic operates based on a signal received from a sensor provided in a vehicle and operating the shimmy compensation logic, a shimmy compensation rack force generation unit generating a shimmy compensation rack force based on a velocity of a wheel and a rack force signal of the vehicle if the shimmy compensation logic operates, and a reaction force torque signal output unit generating a reaction force torque signal based on the shimmy compensation rack force and outputting the reaction force torque signal to a reaction force motor.

The steering control method and steering control device according to the present embodiments may compensate for shimmy even when the torque sensor fails and remove only shimmy components without affecting the steering feel by compensating for shimmy using the road wheel actuator-side rack force signal, rather than the steering feedback actuator-side torque signal.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
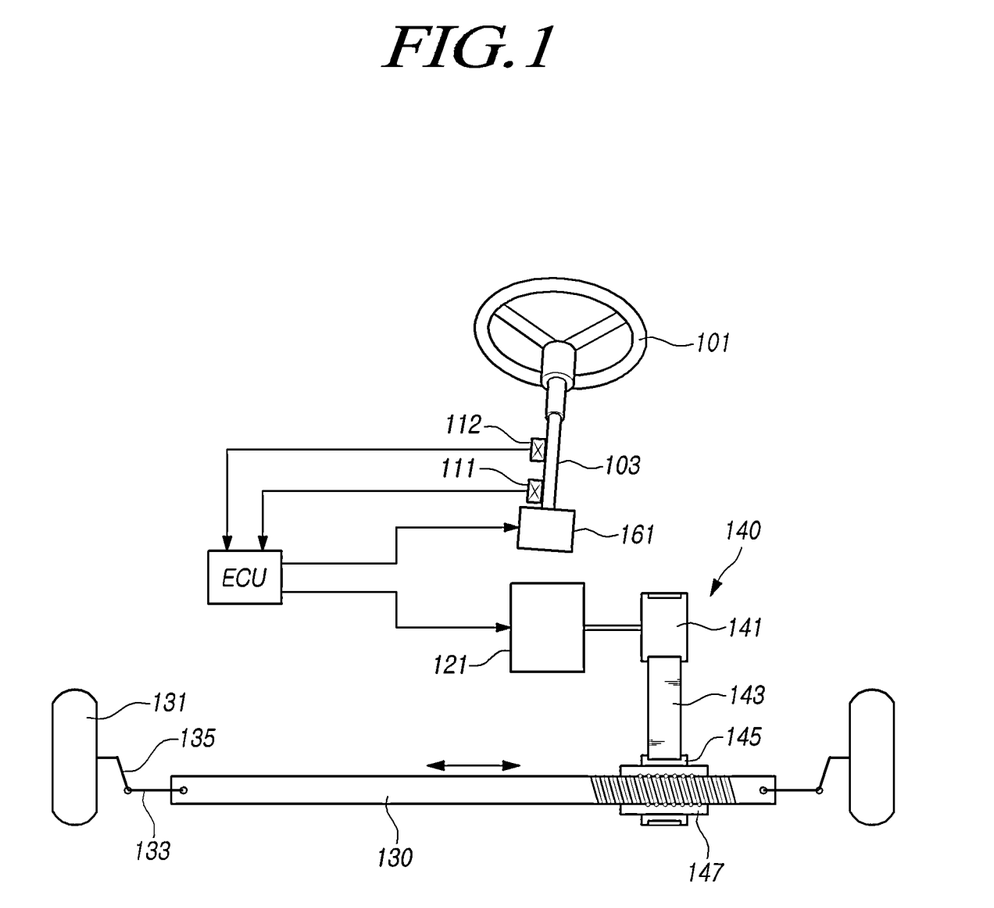
FIG. 1 is a view schematically illustrating a steering device according to the present embodiments.

FIG. 1 is a view schematically illustrating a steering device according to the present embodiments.

Referring to FIG. 1, in a steer-by-wire-based vehicle steering device, a steering angle sensor 112 and a torque sensor 111 are coupled to one side of a steering shaft 103 connected with a steering wheel 101. When the driver manipulates the steering wheel 101, the steering angle sensor 112 and the torque sensor 111 detect it and send an electrical signal to an electronic control unit (ECU) to thereby operate a reaction force motor 161 included in a steering feedback actuator and an auxiliary power motor 121 included in a road wheel actuator.

The electronic control unit (ECU) controls the steering feedback actuator, which is an upper end device, and the road wheel actuator, which is a lower end device, based on the electrical signals transmitted from the steering angle sensor 112 and the torque sensor 111 and electrical signals transmitted from other several sensors mounted to the vehicle.

The auxiliary power motor 121 provided in the road wheel actuator slides the rack bar 130 connected with a belt-type transmission 140 to steer the two opposite wheels through the tie roads 133 and knuckle arms 135. The belt-type transmission 140 may include a motor pulley 141 coupled to the rotational shaft of the road wheel actuator 121, a nut pulley 145 coupled to the outer circumferential surface of the ball nut 147, and a belt 143 connecting the motor pulley 141 and the nut pulley 145.

The reaction force motor 161 provided in the steering feedback actuator generates a steering reaction force sensation in the opposite direction when the driver manipulates the steering wheel 101 or steers the steering shaft 103 upon autonomous driving based on the operation of the road wheel actuator by the auxiliary power motor 121.

Although FIG. 1 illustrates that the steering angle sensor 112 and the torque sensor 111 are provided on the steering shaft 103 for convenience of description, the vehicle may further include a motor position sensor and various radar devices, or camera image sensor to transmit steering information to the electronic control unit (ECU), which is omitted from the following detailed description.

Conventionally, the shimmy frequency is found using the torque signal by the torque sensor 111 provided on the steering shaft 103, and the shimmy vibration is compensated for by signal-processing the shimmy frequency. For example, conventionally, the torque signal sensed by the torque sensor 111 provided on the steering shaft 103 is filtered, and feedback is provided to the reaction force motor 161 provided in the steering feedback actuator 161 based on the filtered signal to compensate for shimmy. However, such shimmy compensation may negatively affect the steering feel due to, e.g., phase delay. Further, no torque signal is received if the torque sensor 111 fails, so that torque signal-based shimmy compensation is impossible.

Figure 2:
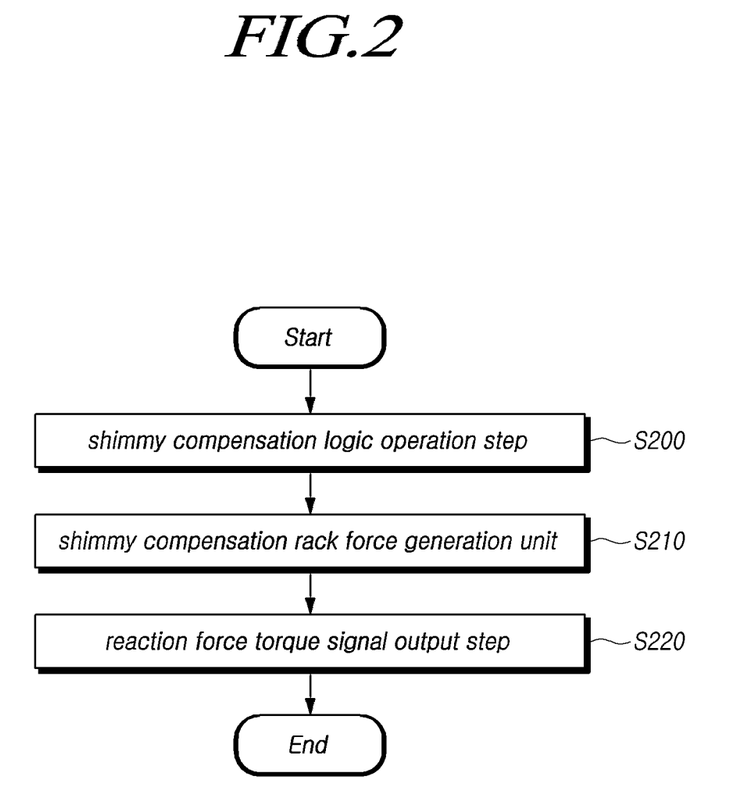
FIG. 2 is a flowchart illustrating a steering control method according to the present embodiments.

FIG. 2 is a flowchart illustrating a steering control method according to the present embodiments.

Referring to FIG. 2, a steering control method according to the present embodiments may include a shimmy compensation logic operation step determining whether a shimmy compensation logic operates based on a signal received from a sensor of a vehicle and operating the shimmy compensation logic (S200).

The sensor provided to the vehicle may include a vehicle velocity sensor, an steering angle sensor, and a steering angular velocity sensor. However, without limitations thereto, other sensors, such as a vehicle dynamics information sensor and a vehicle ambient detection sensor, may further be included. For example, a torque sensor, a rack force sensor, a radar sensor, a camera sensor, or a lidar sensor may further be included. In particular, in the case of the torque sensor, the present embodiments may apply even when the torque sensor fails.

The vehicle velocity sensor may sense vehicle velocity information and transmit the vehicle velocity signal to the sense rotational angle information about the steering shaft and transmit the steering angle signal to the electronic control unit. Further, the steering angular velocity sensor may sense variation velocity information about the rotational angle of the steering shaft and transmit the rotational angle velocity signal to the electronic control unit.

The shimmy compensation logic operation step may determine whether a preset operation condition is met based on a vehicle velocity signal, a steering angle signal, and a steering angular velocity signal received from the sensor and, if the operation condition is met, operate the shimmy compensation logic.

The preset operation condition may be a state in which shimmy compensation is required and may be preset as a combination of the respective values of the signals previously obtained by experiment or may be set as a combination of the respective values of the signals by the setter. Further, the preset operation condition may be updated or changed by a settings change, rather than fixed.

Referring to FIG. 2, the steering control method according to the present embodiments may include a shimmy compensation rack force generation step generating a shimmy compensation rack force based on a velocity of a wheel and a rack force signal of the vehicle if the shimmy compensation logic operates (S210).

The vehicle rack force signal may be generated based on information sensed by the rack force sensor provided to the vehicle. However, without limitations thereto, the vehicle rack force signal may be generated based on information sensed by the steering angle sensor and the steering angular velocity sensor provided to the vehicle. For example, the position of the rack bar may be estimated based on the steering angle information sensed by the steering angle sensor, the moving velocity of the rack bar may be estimated based on the steering angular velocity information sensed by the steering angular velocity sensor, and the rack force signal may be determined and generated based on the estimated rack bar position and rack bar moving velocity.

The vehicle velocity may be generated based on the information sensed by the wheel velocity sensor provided to the vehicle. However, without limitations thereto, the vehicle velocity may be generated based on the velocity information sensed by the velocity sensor provided to the vehicle. For example, the wheel 140 rotational velocity may be estimated based on the velocity information by the velocity sensor, and the wheel velocity signal may be generated by using the estimated wheel rotational velocity as the wheel velocity.

The shimmy compensation rack force generation step may set a bandwidth of a bandpass filter based on a wheel frequency determined based on a velocity of the wheel.

The wheel frequency used to set the bandwidth of the bandpass filter may be determined in proportion to the wheel velocity. For example, the wheel frequency may be determined as a value produced by dividing the velocity of the wheel by π*wheel diameter*first constant.

Meanwhile, the bandwidth of the bandpass filter may be set according to the determined wheel frequency. For example, the shimmy compensation rack force generation step may set the bandwidth of the bandpass filter according to a preset bandwidth determination value based on the determined wheel frequency.

The shimmy compensation rack force generation step may pass the rack force signal through the bandpass filter to generate a filtered rack force signal including a shimmy frequency band. The shimmy compensation rack force generation step may determine a gain based on a steering angle and vehicle velocity of the vehicle and generate a shimmy rack force signal based on the filtered rack force signal and the gain. The shimmy rack force signal may mean a signal including a predetermined frequency band in which shimmy vibration may be generated in the rack force signal.

The shimmy compensation rack force generation step may generate a shimmy compensation rack force signal based on the rack force signal and the shimmy rack force signal. The shimmy compensation rack force signal may mean a signal free from the component causing shimmy in the rack force signal.

Referring to FIG. 2, the steering control method according to the present embodiments may include a reaction force torque signal output step generating a reaction force torque signal based on the shimmy compensation rack force and outputting the reaction force torque signal to a reaction force motor (S220).

The reaction force torque signal may mean the torque output signal to be output to the reaction force motor provided in the steering feedback actuator. The reaction force torque signal may be generated based on the shimmy compensation rack force. Accordingly, the reaction force torque signal output step may output the torque signal, which is determined based on the signal free from the component causing shimmy in the rack force signal, to the reaction force motor provided in the steering feedback actuator.

The above-described steering control method according to the present embodiments may compensate for shimmy even when the torque sensor fails and remove only shimmy components without affecting the steering feel by compensating for shimmy using the road wheel actuator-side rack force signal, rather than the steering feedback actuator-side torque signal.

Figure 3:
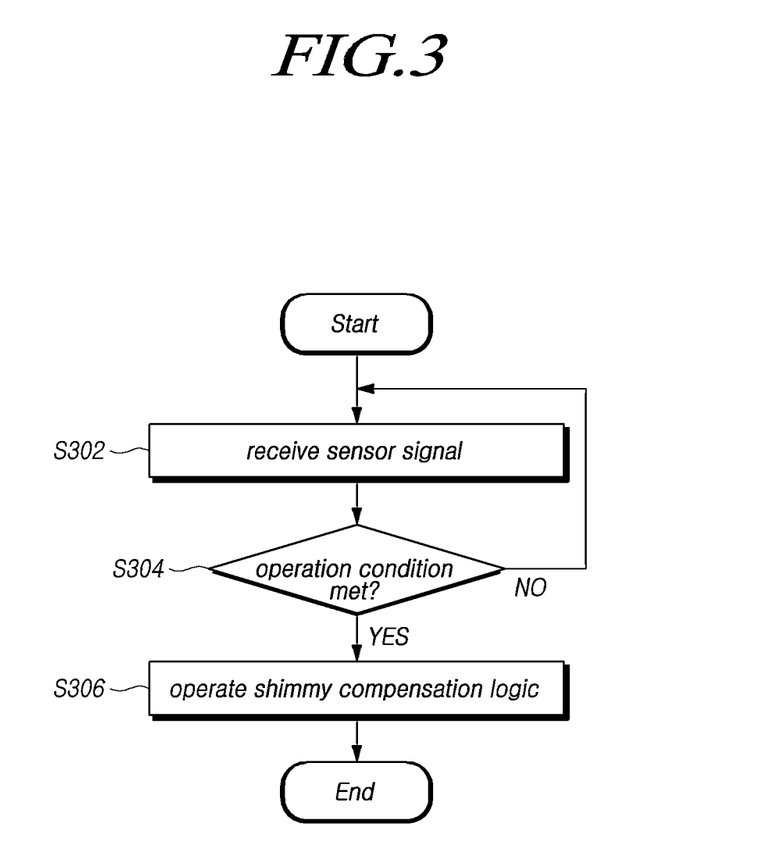
FIG. 3 is a flowchart illustrating a shimmy compensation logic operation step of a steering control method according to the present embodiments.

FIG. 3 is a flowchart illustrating a shimmy compensation logic operation step of a steering control method according to the present embodiments.

Referring to FIG. 3, the shimmy compensation logic operation step may receive a sensor signal from the sensor (S302). For example, the shimmy compensation logic operation step may receive the vehicle velocity signal from the vehicle velocity sensor, the steering angle signal from the steering angle sensor, and the steering angular velocity signal from the steering angular velocity sensor.

The shimmy compensation logic operation step may determine whether a preset operation condition is met based on the vehicle velocity signal, steering angle signal, and steering angular velocity signal received from the sensor (S304).

The preset operation condition may be set as a combination of the values where shimmy vibration occurs in the rack force based on the vehicle velocity, steering angle, and steering angular velocity. In other words, the preset operation condition may be set based on the values where shimmy vibration occurs in the rack force according to the combination of the vehicle velocity, steering angle, and steering angular velocity. For example, the preset operation condition may be set in a mapping table in which the values where shimmy vibration occurs in the rack force according to the combination of the vehicle velocity, steering angle, and steering angular velocity are mapped, but is not limited thereto. In other words, the setting format is not limited to the mapping table, and the values where shimmy vibration occurs in the rack force may be set in other presettable formats.

Accordingly, if the preset operation condition is met based on the received vehicle velocity signal, steering angle signal, and steering angular velocity signal, the shimmy compensation logic operation step may operate the shimmy compensation logic (S306). Therefore, if the preset operation condition is met, shimmy may be compensated for by immediate operation of the shimmy compensation logic.

In contrast, if the preset operation condition is not met based on the received vehicle velocity signal, steering angle signal, and steering angular velocity signal, the shimmy compensation logic operation step may receive updated sensor signals and again determine whether the preset operation condition is met based on the updated sensor signals.

Although not shown in FIG. 3, if the shimmy compensation logic is operated, but the preset operation condition fails to be met based on the received updated vehicle velocity signal, steering angle signal, and steering angular velocity signal, the shimmy compensation logic operation step may stop the shimmy compensation logic.

Figure 4:
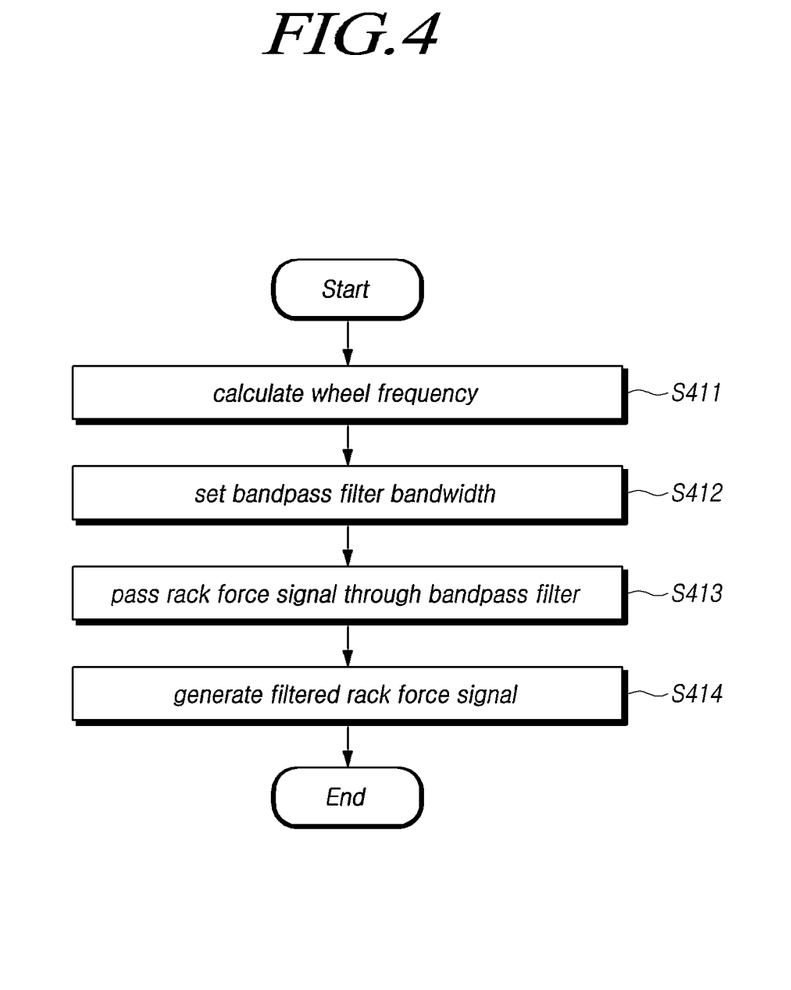
FIG. 4 is a flowchart illustrating a process of generating a filtered rack force signal in a shimmy compensation rack force generation step of a steering control method according to the present embodiments.

FIG. 4 is a flowchart illustrating a process of generating a filtered rack force signal in a shimmy compensation rack force generation step of a steering control method according to the present embodiments.

Referring to FIG. 4, the shimmy compensation rack force generation step may determine a wheel frequency based on the wheel velocity (S411). For example, the wheel frequency may be determined in proportion to the wheel velocity. When the wheel velocity increases, the wheel frequency may be determined to be a larger value in proportion to the increase in wheel velocity. Further, when the wheel velocity decreases, the wheel frequency may be determined to be a smaller value in proportion to the decrease in wheel velocity. In other words, the wheel frequency may be determined to be a different value depending on the wheel velocity. Further, the wheel frequency may be determined as a value produced by dividing the wheel velocity by $\pi$*wheel diameter*first constant.

As described above, the wheel velocity may be generated based on the information sensed by the wheel velocity sensor or generated from velocity information by the velocity sensor provided to the vehicle.

The diameter of the wheel may mean a preset value but, without limitations thereto, the set value may be changed in response to a wheel change. The diameter of the wheel may mean a value input by the vehicle driver or vehicle mechanic.

The first constant may mean a preset correction value for determining the wheel frequency. The first constant may have a fixed value. For example, the first constant may be 3.6. However, embodiments of the disclosure are not limited thereto. As an example, the first constant may be set to be larger or smaller than 3.6 depending on the state of the wheel. As another example, the first constant may be set to be larger or smaller than 3.6 depending on the state of the tire. Meanwhile, the first constant may be experimentally determined depending on the state of the wheel and the state of the tire or may be changed.

The shimmy compensation rack force generation step may set a bandwidth of a bandpass filter based on a wheel frequency determined based on a velocity of the wheel (S412).

For example, the shimmy compensation rack force generation step may set the bandwidth of the bandpass filter according to a preset bandwidth determination value based on the determined wheel frequency.

A bandwidth determination value may be preset to set the bandwidth of the bandpass filter based on the determined wheel frequency. In this case, a frequency lower limit and a frequency upper limit may be determined according to the preset bandwidth determination value based on the value in the wheel frequency, and the range between the frequency lower limit and the frequency upper limit may be set to the bandwidth of the bandpass filter. For example, when the bandwidth determination value is set to 3, the frequency value of −3 in the wheel frequency may be determined to be the frequency lower limit, and the frequency value of +3 in the wheel frequency may be determined to be the frequency upper limit, so that the range between the frequency lower limit and the frequency upper limit may be set as the bandwidth. However, setting the bandwidth determination value to 3 is an example, and may be set to a different value. Since in the shimmy compensation rack force generation step, the wheel frequency may be determined to differ based on the wheel velocity, and the bandwidth of the bandpass filter is set according to the wheel frequency, the bandwidth of the bandpass filter may be set to differ depending on the wheel velocity.

The shimmy compensation rack force generation step may pass the rack force signal through the bandpass filter (S413), thus generating a filtered rack force signal including a shimmy frequency band (S414).

The wheel frequency may mean the center frequency at which shimmy occurs, and the bandpass filter is set to differ depending on the wheel frequency. Thus, the filtered rack force signal resultant from passing the rack force signal through the bandpass filter may mean a signal including a shimmy frequency band.

Accordingly, the filtered rack force signal is a signal including a shimmy frequency band and may mean a signal causing shimmy, to be removed from the rack force signal.

Figure 5:
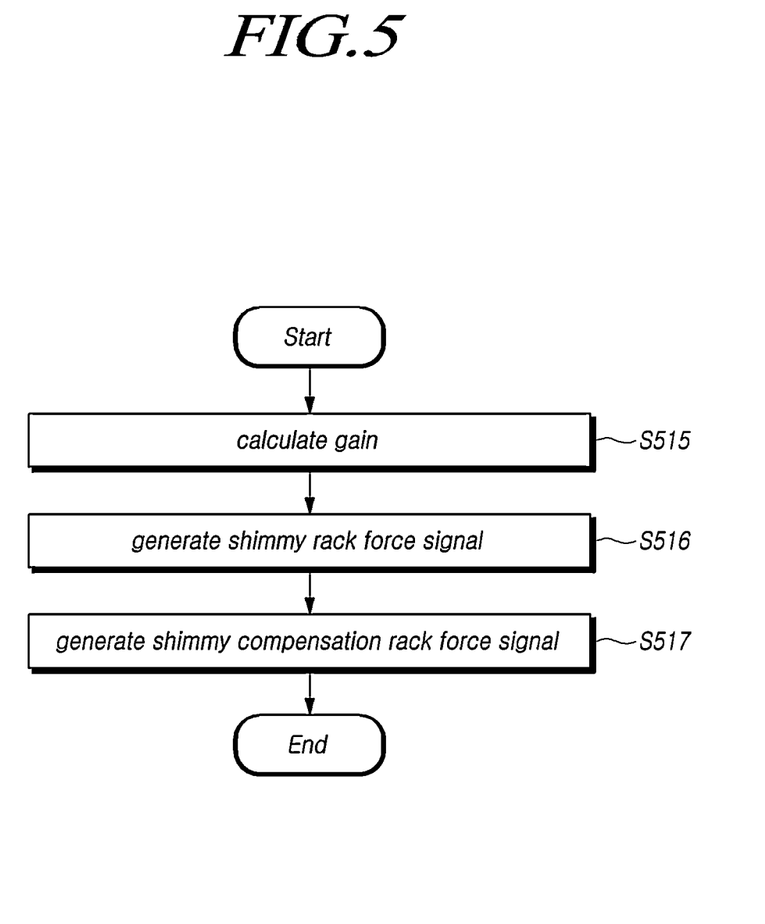
FIG. 5 is a flowchart illustrating a process of generating a shimmy compensation rack force signal in a shimmy compensation rack force generation step of a steering control method according to the present embodiments.

FIG. 5 is a flowchart illustrating a process of generating a shimmy compensation rack force signal in a shimmy compensation rack force generation step of a steering control method according to the present embodiments.

Referring to FIG. 5, the shimmy compensation rack force generation step may determine a gain based on a steering angle and vehicle velocity of the vehicle (S515) and generate a shimmy rack force signal based on the filtered rack force signal and the gain (S516).

The gain may be determined by a preset tuning map according to the steering angle and vehicle velocity. The tuning map may mean a known map set based on the steering angle and the vehicle velocity. In other words, the tuning map may mean a map having a specific value set based on the steering angle and the vehicle velocity, but is not limited thereto. For example, the tuning map may also mean a map in which other parameters are included in the steering angle and vehicle velocity and the specific value is varied depending on a change in the other parameters.

The shimmy compensation rack force generation step may generate the shimmy rack force signal by multiplying the filtered rack force signal including the shimmy frequency band by the gain. In other words, the shimmy rack force signal may mean a value produced by applying the gain according to the steering angle and vehicle velocity to the filtered rack force signal including the shimmy frequency band.

Further, the shimmy compensation rack force generation step may generate a shimmy compensation rack force signal based on the rack force signal and the shimmy rack force signal (S517). For example, the shimmy compensation rack force generation step may generate a shimmy compensation rack force signal by subtracting the shimmy rack force signal from the rack force signal. In other words, the shimmy compensation rack force signal may mean a signal free from the shimmy rack force signal which is the rack force component causing shimmy in the rack force signal.

In other words, the shimmy compensation rack force signal may remove the rack force component causing shimmy, which may be included in the rack force signal, by subtracting the filtered rack force signal included in the gain-applied shimmy frequency band from the rack force signal.

Although not shown in FIG. 5, the reaction force torque signal output step may generate a reaction force torque signal based on the shimmy compensation rack force signal generated in the shimmy compensation rack force generation step and output the generated reaction force torque signal to the reaction force motor.

Since the shimmy compensation rack force signal is the rack force signal free from the shimmy rack force signal which is the rack force component causing shimmy, the reaction force torque signal generated in the reaction force torque signal output step may mean a torque signal determined by compensating for shimmy in the rack force.

The above-described steering control method according to the present embodiments may compensate for shimmy even when the torque sensor fails and remove only shimmy components without affecting the steering feel by compensating for shimmy using the road wheel actuator-side rack force signal, rather than the steering feedback actuator-side torque signal.

A steering control device capable of performing the steering control method described in connection with FIGS. 1 to 5 is briefly described again below. The steering control device described below may perform all or some operations of the above-described steering control method. Further, the steering control device may perform any combination of the above-described embodiments.

Figure 6:
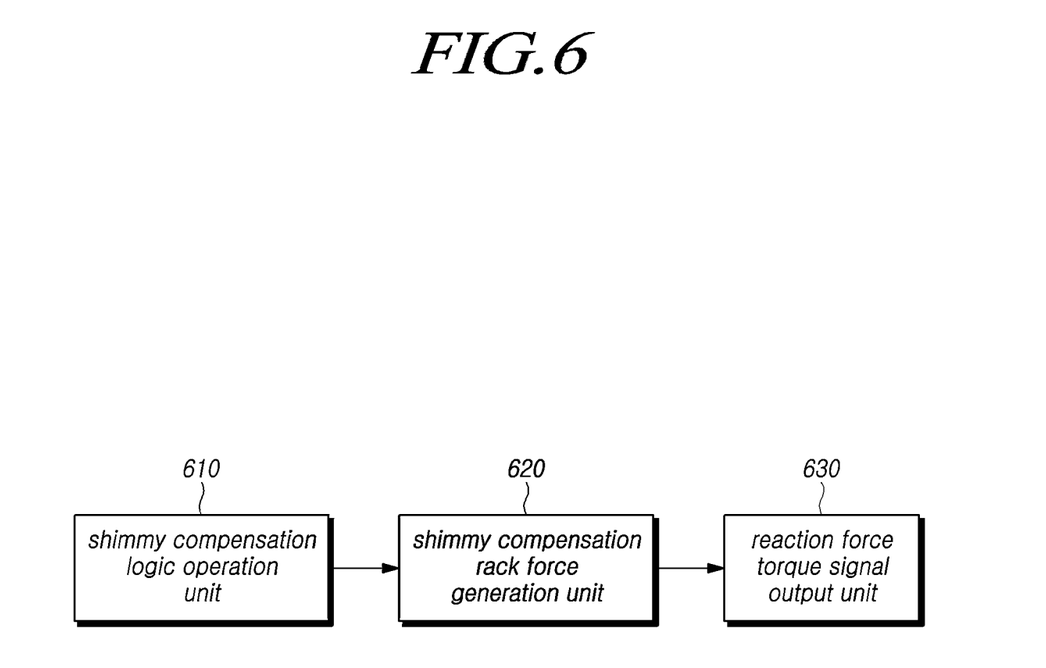
FIG. 6 is a block diagram illustrating a steering control device according to the present embodiments.

FIG. 6 is a block diagram illustrating a steering control device according to the present embodiments.

Referring to FIG. 6, a steering control device according to the present embodiments may include a shimmy compensation logic operation unit 610 determining whether a shimmy compensation logic operates based on a signal received from a sensor provided to a vehicle and operating the shimmy compensation logic.

The sensor provided to the vehicle may include a vehicle velocity sensor, an steering angle sensor, and a steering angular velocity sensor. However, without limitations thereto, other sensors, such as a vehicle dynamics information sensor and a vehicle ambient detection sensor, may further be included. For example, a torque sensor, a rack force sensor, a radar sensor, a camera sensor, or a lidar sensor may further be included. In particular, the present embodiments may apply to the torque sensor even when the torque sensor fails.

The vehicle velocity sensor may sense vehicle velocity information and transmit the vehicle velocity signal to the sense rotational angle information about the steering shaft and transmit the steering angle signal to the electronic control unit. Further, the steering angular velocity sensor may sense variation velocity information about the rotational angle of the steering shaft and transmit the rotational angle velocity signal to the electronic control unit.

The shimmy compensation logic operation unit 610 may determine whether a preset operation condition is met based on a vehicle velocity signal, a steering angle signal, and a steering angular velocity signal received from the sensor and, if the operation condition is met, operate the shimmy compensation logic.

The preset operation condition may be a state in which shimmy compensation is required and may be preset as a combination of the respective values of the signals previously obtained by experiment or may be set as a combination of the respective values of the signals by the setter. Further, the preset operation condition may be updated or changed by a settings change, rather than fixed.

Referring to FIG. 6, the steering control device according to the present embodiments may include a shimmy compensation rack force generation unit 620 generating a shimmy compensation rack force based on a velocity of a wheel and a rack force signal of the vehicle if the shimmy compensation logic operates.

The vehicle rack force signal may be generated based on information sensed by the rack force sensor provided to the vehicle. However, without limitations thereto, the vehicle rack force signal may be generated based on information sensed by the steering angle sensor and the steering angular velocity sensor provided to the vehicle. For example, the position of the rack bar may be estimated based on the steering angle information sensed by the steering angle sensor, the moving velocity of the rack bar may be estimated based on the steering angular velocity information sensed by the steering angular velocity sensor, and the rack force signal may be determined and generated based on the estimated rack bar position and rack bar moving velocity.

The vehicle velocity may be generated based on the information sensed by the wheel velocity sensor provided to the vehicle. However, without limitations thereto, the vehicle velocity may be generated based on the velocity information sensed by the velocity sensor provided to the vehicle. For example, the wheel 140 rotational velocity may be estimated based on the velocity information by the velocity sensor, and the wheel velocity signal may be generated by using the estimated wheel rotational velocity as the wheel velocity.

The shimmy compensation rack force generation unit 620 may set a bandwidth of a bandpass filter based on a wheel frequency determined based on a velocity of the wheel.

The wheel frequency used to set the bandwidth of the bandpass filter may be determined in proportion to the wheel velocity. For example, the wheel frequency may be determined as a value produced by dividing the velocity of the wheel by $\pi$*wheel diameter*first constant.

Meanwhile, the bandwidth of the bandpass filter may be set according to the determined wheel frequency. For example, the shimmy compensation rack force generation unit 620 may set the bandwidth of the bandpass filter according to a preset bandwidth determination value based on the determined wheel frequency.

The shimmy compensation rack force generation unit 620 may pass the rack force signal through the bandpass filter to generate a filtered rack force signal including a shimmy frequency band. The shimmy compensation rack force generation unit 620 may determine a gain based on a steering angle and vehicle velocity of the vehicle and generate a shimmy rack force signal based on the filtered rack force signal and the gain. The shimmy rack force signal may mean a signal including a predetermined frequency band in which shimmy vibration may be generated in the rack force signal.

The shimmy compensation rack force generation unit 620 may generate a shimmy compensation rack force signal based on the rack force signal and the shimmy rack force signal. The shimmy compensation rack force signal may mean a signal free from the component causing shimmy in the rack force signal.

Referring to FIG. 6, the steering control device according to the present embodiments may include a reaction force torque signal output unit 630 generating a reaction force torque signal based on the shimmy compensation rack force and outputting the reaction force torque signal to a reaction force motor.

The reaction force torque signal may mean the torque output signal to be output to the reaction force motor provided in the steering feedback actuator. The reaction force torque signal may be generated based on the shimmy compensation rack force. Accordingly, the reaction force torque signal output unit 630 may output the torque signal, which is determined based on the signal freed from the component causing shimmy in the rack force signal, to the reaction force motor provided in the steering feedback actuator.

The above-described steering control device according to the present embodiments may compensate for shimmy using a rack force signal, rather than steering wheel torque signal, preventing a negative influence on the steering feel due to a phase delay occurring when compensating for shimmy using the steering wheel torque signal and compensating for shimmy even when the torque sensor fails.

Figure 7:
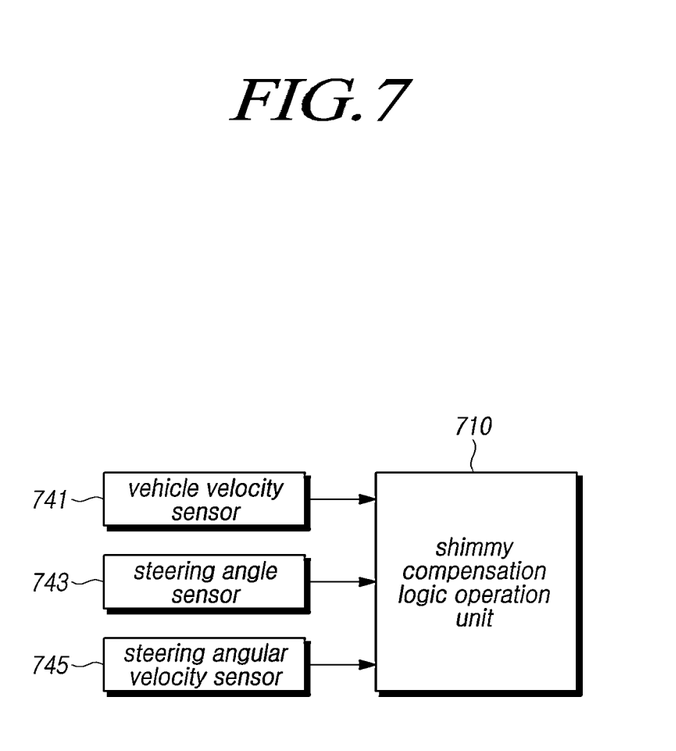
FIG. 7 is a block diagram illustrating a shimmy compensation logic operation unit of a steering control device according to the present embodiments.

FIG. 7 is a block diagram illustrating a shimmy compensation logic operation unit of a steering control device according to the present embodiments.

Referring to FIG. 7, the sensor may include a vehicle velocity sensor 741, a steering angle sensor 743, and a steering angular velocity sensor 745.

The shimmy compensation logic operation unit 710 may receive the vehicle velocity signal from the vehicle velocity sensor 741, the steering angle signal from the steering angle sensor 743, and the steering angular velocity signal from the steering angular velocity sensor 745.

The shimmy compensation logic operation unit 710 may determine whether a preset operation condition is met based on the vehicle velocity signal, steering angle signal, and steering angular velocity signal received from the sensor.

The preset operation condition may be set as a combination of the values where shimmy vibration occurs in the rack force based on the vehicle velocity, steering angle, and steering angular velocity. In other words, the preset operation condition may be set based on values where shimmy vibration occurs in the rack force according to a combination of the vehicle velocity, steering angle, and steering angular velocity, and may be set, e.g., in a table in which the values where shimmy vibration occurs in the rack force according to the combination of the vehicle velocity, steering angle, and steering angular velocity are mapped, but is not limited thereto.

Accordingly, if the preset operation condition is met based on the received vehicle velocity signal, steering angle signal, and steering angular velocity signal is met, the shimmy compensation logic operation unit 710 may operate the shimmy compensation logic. Therefore, if the preset operation condition is met, shimmy may be compensated for by immediate operation of the shimmy compensation logic.

In contrast, the shimmy compensation logic operation unit 710 may not operate the shimmy compensation logic if the preset operation condition is not met based on the received vehicle velocity signal, steering angle signal, and steering angular velocity signal and, if the shimmy compensation logic operates but the preset operation condition fails to be met based on the received updated vehicle velocity signal, steering angle signal, and steering angular velocity signal, stop the operation of the shimmy compensation logic.

Figure 8:
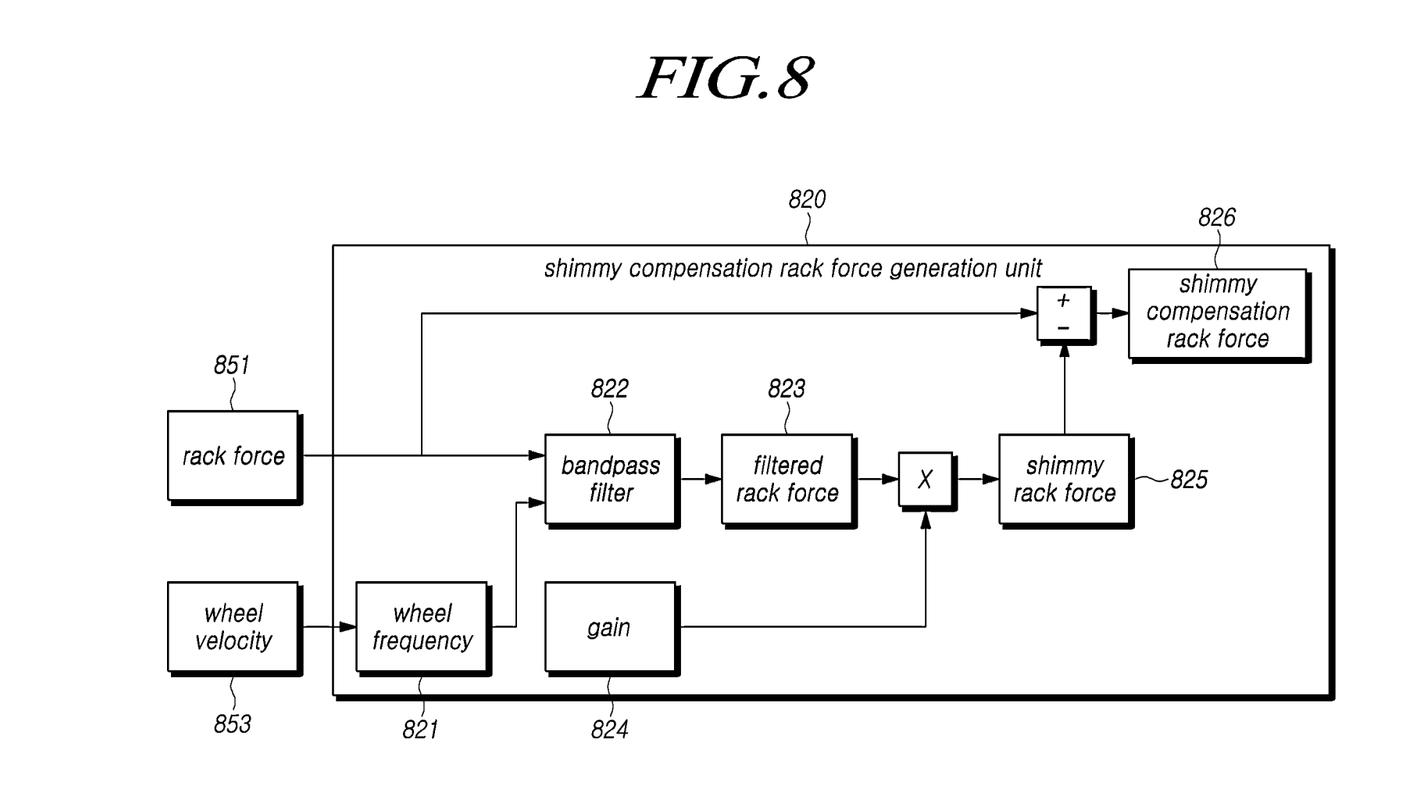
FIG. 8 is a block diagram illustrating a shimmy compensation rack force generation unit of a steering control device according to the present embodiments.

FIG. 8 is a block diagram illustrating a shimmy compensation rack force generation unit of a steering control device according to the present embodiments.

Referring to FIG. 8, the shimmy compensation rack force generation unit 820 may determine a wheel frequency 821 based on the wheel velocity 853. For example, the wheel frequency may be determined in proportion to the wheel velocity. When the wheel velocity increases, the wheel frequency may be determined to be a larger value in proportion to the increase in wheel velocity. Further, when the wheel velocity decreases, the wheel frequency may be determined to be a smaller value in proportion to the decrease in wheel velocity. In other words, the wheel frequency may be determined to be a different value depending on the wheel velocity.

Further, the wheel frequency 821 may be determined as a value produced by dividing the wheel velocity 853 by π*wheel diameter*first constant.

As described above, the wheel velocity 853 may be generated based on the information sensed by the wheel velocity sensor or generated from velocity information by the velocity sensor provided to the vehicle.

The diameter of the wheel may mean a preset value but, without limitations thereto, the set value may be changed in response to a wheel change. The diameter of the wheel may mean a value input by the vehicle driver or vehicle mechanic.

The first constant may mean a preset correction value for determining the wheel frequency. The first constant may have a fixed value. For example, the first constant may be 3.6 but is not limited thereto.

The shimmy compensation rack force generation unit 820 may set a bandwidth of a bandpass filter 822 based on a wheel frequency 821 determined based on a velocity 853 of the wheel.

For example, the shimmy compensation rack force generation unit 820 may set the bandwidth of the bandpass filter according to a preset bandwidth determination value based on the determined wheel frequency. In other words, a frequency lower limit and a frequency upper limit may be determined according to the preset bandwidth determination value based on the value in the wheel frequency, and the range between the frequency lower limit and the frequency upper limit may be set to the bandwidth of the bandpass filter.

Accordingly, in the shimmy compensation rack force generation unit 820, the wheel frequency 821 may be determined to differ based on the wheel velocity 853, and the bandwidth of the bandpass filter 822 is set depending on the wheel frequency 821. Thus, the bandwidth of the bandpass filter 822 may be set to differ depending on the wheel velocity 853.

The shimmy compensation rack force generation unit 820 may pass the rack force signal 851 through the bandpass filter 822 to generate a filtered rack force signal 823 including a shimmy frequency band.

The wheel frequency 821 may mean the center frequency at which shimmy occurs, and the bandpass filter 822 is set to differ depending on the wheel frequency 821. Thus, the filtered rack force signal 823 resultant from passing the rack force signal 851 through the bandpass filter 822 may mean a signal including a shimmy frequency band.

Accordingly, the filtered rack force signal 823 is a signal including a shimmy frequency band and may mean a signal causing shimmy, to be removed from the rack force signal 851.

The shimmy compensation rack force generation unit 820 may determine a gain 824 based on a steering angle and vehicle velocity of the vehicle and generate a shimmy rack force signal 825 based on the filtered rack force signal 823 and the gain 824.

The gain may be determined by a preset tuning map according to the steering angle and vehicle velocity, and the tuning map may mean a known map configured based on the steering angle and vehicle velocity.

The shimmy compensation rack force generation unit 820 may generate a shimmy rack force signal 825 by multiplying the filtered rack force signal 823 including a shimmy frequency band by the gain 824. In other words, the shimmy rack force signal 825 may mean a value produced by applying the gain 824 according to the steering angle and vehicle velocity to the filtered rack force signal 823 including the shimmy frequency band.

Further, the shimmy compensation rack force generation unit 820 may generate a shimmy compensation rack force signal 826 based on the rack force signal 851 and the shimmy rack force signal 825. For example, the shimmy compensation rack force generation unit 820 may generate a shimmy compensation rack force signal 826 by subtracting the shimmy rack force signal 825 from the rack force signal 851. In other words, the shimmy compensation rack force signal 826 may mean a signal free from the shimmy rack force signal 825 which is the rack force component causing shimmy in the rack force signal 851.

Figure 9:
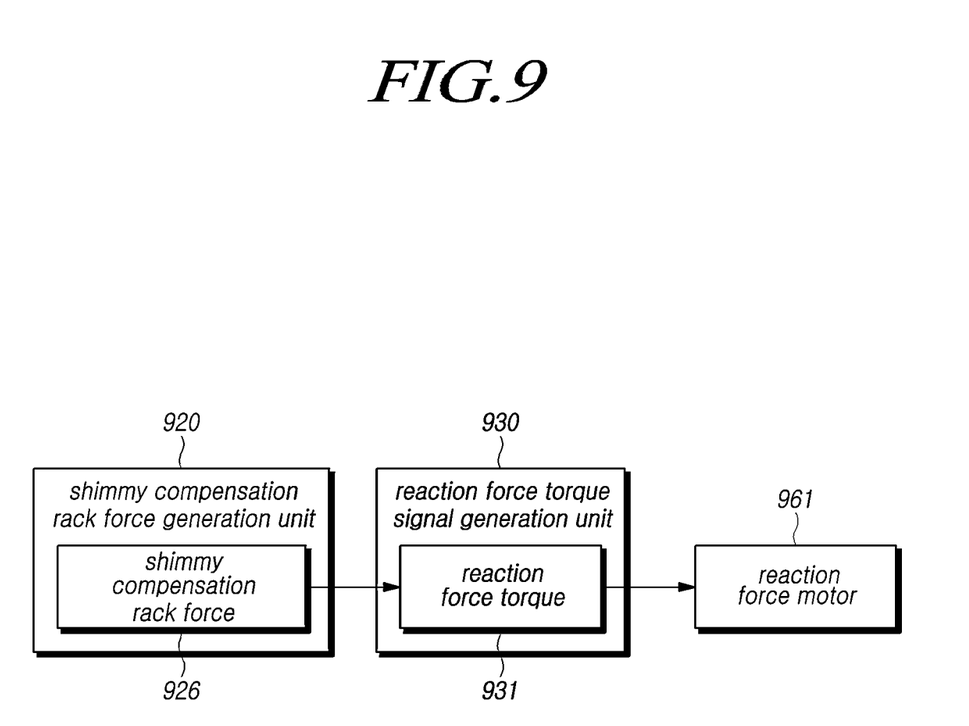
FIG. 9 is a block diagram illustrating a reaction force torque signal output unit of a steering control device according to the present embodiments.

FIG. 9 is a block diagram illustrating a reaction force torque signal output unit of a steering control device according to the present embodiments.

Referring to FIG. 9, the reaction force torque signal output unit 930 may generate a reaction force torque signal 931 based on the shimmy compensation rack force signal 926 generated in the shimmy compensation rack force generation unit 920 and output the generated reaction force torque signal 931 to the reaction force motor 961.

Since the shimmy compensation rack force signal 926 is the rack force signal free from the shimmy rack force signal which is the rack force component causing shimmy, the reaction force torque signal 931 generated based on the shimmy compensation rack force signal 926 in the reaction force torque signal output unit 930 may mean a torque signal determined by compensating for shimmy in the rack force.

The above-described steering control device according to the present embodiments may compensate for shimmy even when the torque sensor fails and remove only shimmy components without affecting the steering feel by compensating for shimmy using the road wheel actuator-side rack force signal, rather than the steering feedback actuator-side torque signal.

Figure 10:
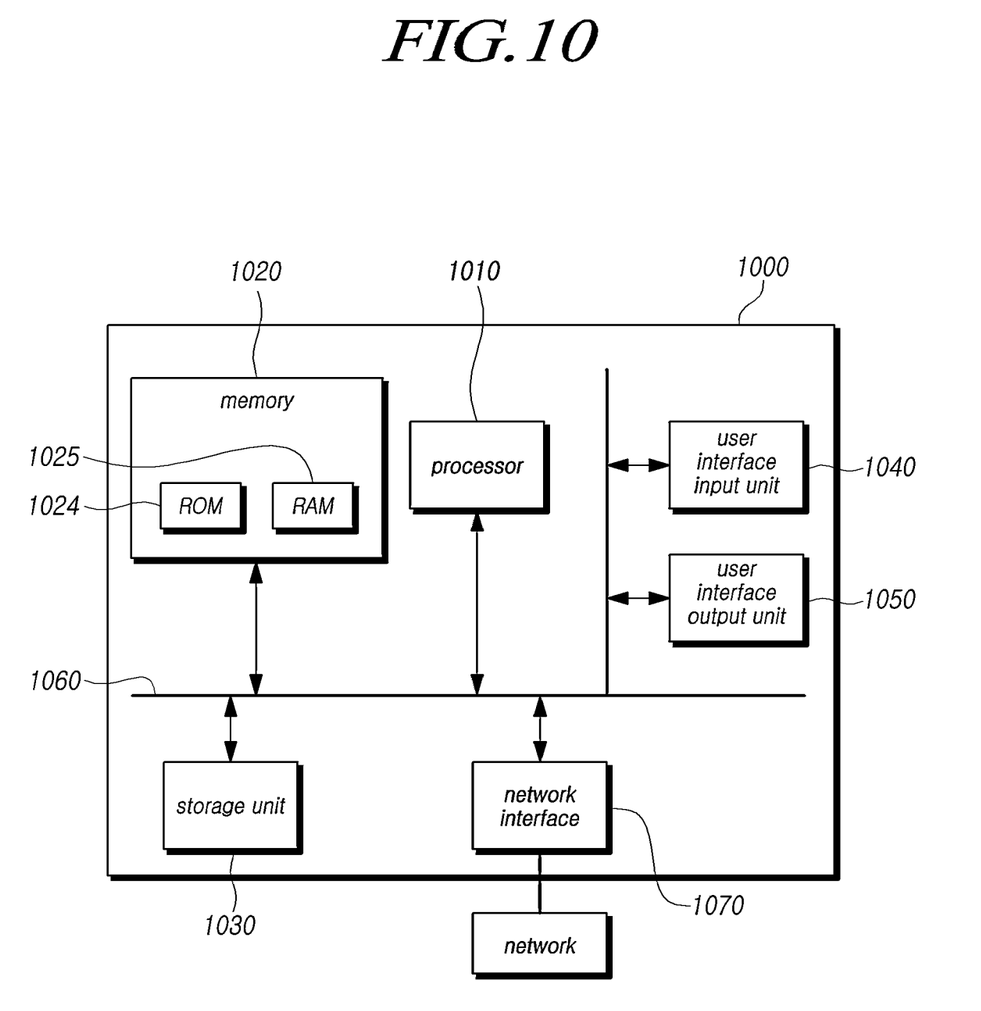
FIG. 10 is a block diagram illustrating a computer system of a steering control device.

FIG. 10 is a block diagram illustrating a computer system of a steering control device.

Referring to FIG. 10, the above-described embodiments may be implemented as, e.g., a computer-readable recording medium, in a computer system 1000. As illustrated in the drawings, the computer system 1000 of the steering control device may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as a non-volatile computer recording medium storing computer-implemented methods or computer executable instructions. The instructions may be executed by the processor to perform a method according to the present embodiments of the disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control method, comprising:
   a shimmy compensation logic operation step determining whether a shimmy compensation logic operates based on a signal received from a sensor provided in a vehicle and operating the shimmy compensation logic;
   a shimmy compensation rack force generation step generating a shimmy compensation rack force based on a velocity of a wheel and a rack force signal of the vehicle if the shimmy compensation logic operates; and
   a reaction force torque signal output step generating a reaction force torque signal based on the shimmy compensation rack force and outputting the reaction force torque signal to a reaction force motor.

2. The steering control method of claim 1, wherein the sensor includes a vehicle velocity sensor, a steering angle sensor, and a steering angular velocity sensor.

3. The steering control method of claim 2, wherein the shimmy compensation logic operation step determines whether a preset operation condition is met based on a vehicle velocity signal, a steering angle signal, and a steering angular velocity signal received from the sensor and, if the operation condition is met, operates the shimmy compensation logic.

4. The steering control method of claim 1, wherein the shimmy compensation rack force generation step sets a bandwidth of a bandpass filter based on a wheel frequency determined based on a velocity of the wheel.

5. The steering control method of claim 4, wherein the wheel frequency is determined in proportion to the velocity of the wheel.

6. The steering control method of claim 5, wherein the wheel frequency is determined as a value produced by dividing the velocity of the wheel by $\pi$*wheel diameter*first constant.

7. The steering control method of claim 4, wherein the shimmy compensation rack force generation step sets the bandwidth of the bandpass filter according to a preset bandwidth determination value based on the determined wheel frequency.

8. The steering control method of claim 4, wherein the shimmy compensation rack force generation step passes the rack force signal through the bandpass filter to generate a filtered rack force signal including a shimmy frequency band.

9. The steering control method of claim 8, wherein the shimmy compensation rack force generation step determines a gain based on a steering angle and vehicle velocity of the vehicle and generates a shimmy rack force signal based on the filtered rack force signal and the gain.

10. The steering control method of claim 9, wherein the shimmy compensation rack force generation step generates a shimmy compensation rack force signal based on the rack force signal and the shimmy rack force signal.

11. A steering control device, comprising:
a shimmy compensation logic operation unit determining whether a shimmy compensation logic operates based on a signal received from a sensor provided in a vehicle and operating the shimmy compensation logic;
a shimmy compensation rack force generation unit generating a shimmy compensation rack force based on a velocity of a wheel and a rack force signal of the vehicle if the shimmy compensation logic operates; and
a reaction force torque signal output unit generating a reaction force torque signal based on the shimmy compensation rack force and outputting the reaction force torque signal to a reaction force motor.

12. The steering control device of claim 11, wherein the sensor includes a vehicle velocity sensor, a steering angle sensor, and a steering angular velocity sensor.

13. The steering control device of claim 12, wherein the shimmy compensation logic operation unit determines whether a preset operation condition is met based on a vehicle velocity signal, a steering angle signal, and a steering angular velocity signal received from the sensor and, if the operation condition is met, operates the shimmy compensation logic.

14. The steering control device of claim 11, wherein the shimmy compensation rack force generation unit sets a bandwidth of a bandpass filter based on a wheel frequency determined based on a velocity of the wheel.

15. The steering control device of claim 14, wherein the wheel frequency is determined in proportion to the velocity of the wheel.

16. The steering control device of claim 15, wherein the wheel frequency is determined as a value produced by dividing the velocity of the wheel by $\pi$*wheel diameter*first constant.

17. The steering control device of claim 14, wherein the shimmy compensation rack force generation unit sets the bandwidth of the bandpass filter according to a preset bandwidth determination value based on the determined wheel frequency.

18. The steering control device of claim 14, wherein the shimmy compensation rack force generation unit passes the rack force signal through the bandpass filter to generate a filtered rack force signal including a shimmy frequency band.

19. The steering control device of claim 18, wherein the shimmy compensation rack force generation unit determines a gain based on a steering angle and vehicle velocity of the vehicle and generates a shimmy rack force signal based on the filtered rack force signal and the gain.

20. The steering control device of claim 19, wherein the shimmy compensation rack force generation unit generates a shimmy compensation rack force signal based on the rack force signal and the shimmy rack force signal.

* * * * *